United States Patent [19]

Meldahl et al.

[11] 4,226,313
[45] Oct. 7, 1980

[54] CLUTCH-BRAKE SYSTEM FOR ROTARY MOWER

[75] Inventors: Robert D. Meldahl, Granville; Robert J. Borel, Columbus, both of Ohio

[73] Assignee: J. A. Masterson & Co., Granville, Ohio

[21] Appl. No.: 808,336

[22] Filed: Jun. 20, 1977

[51] Int. Cl.² .................. F16D 67/02; A01D 69/08
[52] U.S. Cl. .............................. 192/18 R; 56/11.3
[58] Field of Search ............... 56/11.3, 11.7, 11.8; 192/12 R, 14, 16, 18 R, 18 A

[56] References Cited
U.S. PATENT DOCUMENTS

| 2,260,770 | 10/1941 | Brownlee | 192/66 X |
| 3,253,391 | 5/1966 | Mendahl | 192/17 R |
| 3,420,343 | 1/1969 | Stiepel | 192/18 R |
| 3,445,991 | 5/1969 | Hanson et al. | 192/18 R X |
| 4,035,994 | 7/1977 | Hoff | 56/11.3 |

*Primary Examiner*—George H. Krizmanich
*Attorney, Agent, or Firm*—Fay & Sharpe

[57] ABSTRACT

A combination blade clutching and braking mechanism for insuring the safer operation of rotary lawn mowers. The clutching and braking safety mechanism automatically disengages a power clutch while the brake is being engaged. Conversely, when the mower is to be operated, the mechanism automatically disengages the brake and engages the clutch. There is a provision for a dead man control wherein the brake engages automatically and the clutch is disengaged automatically should the operator accidentally lose control of the mower.

12 Claims, 12 Drawing Figures

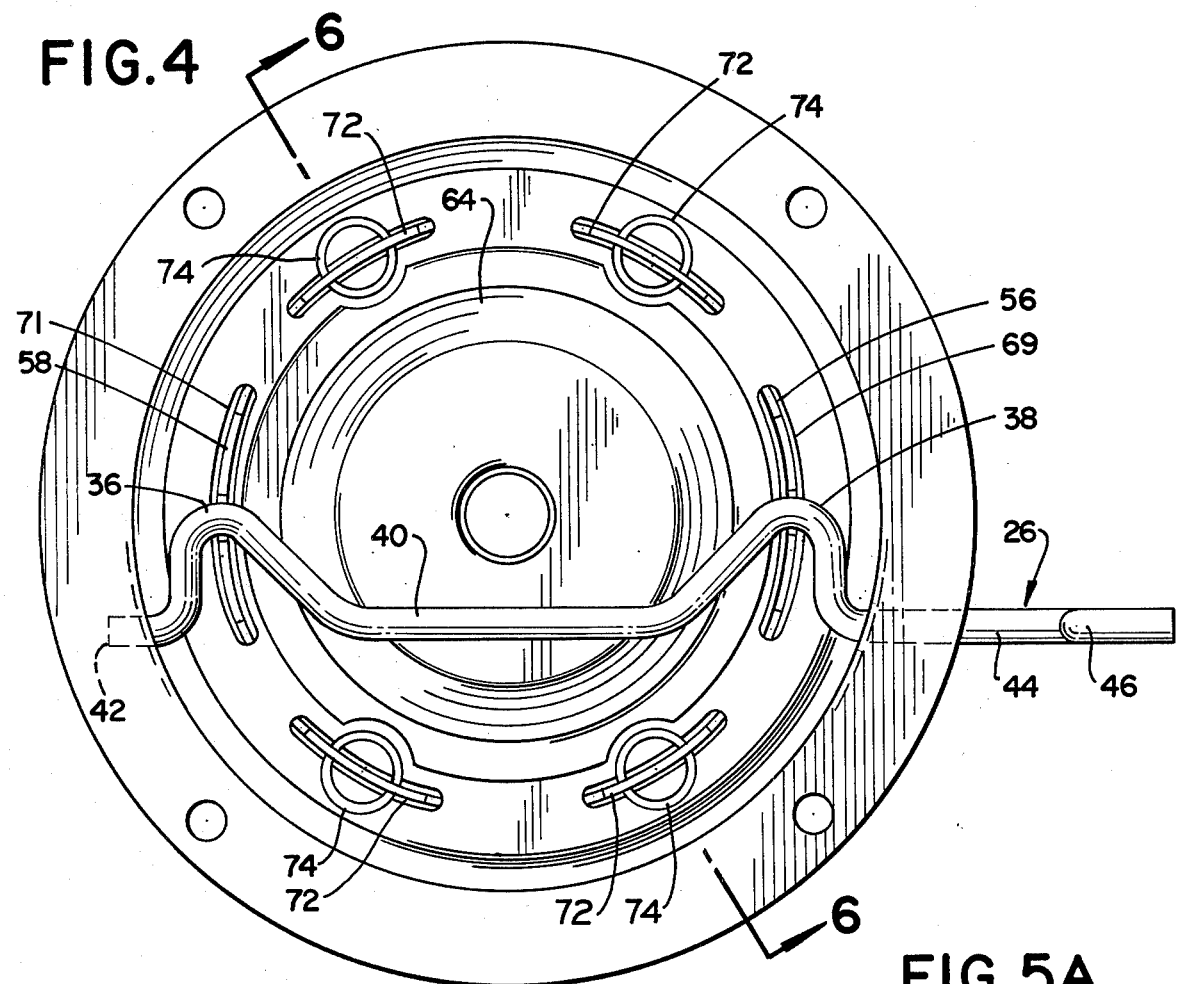
FIG. 4
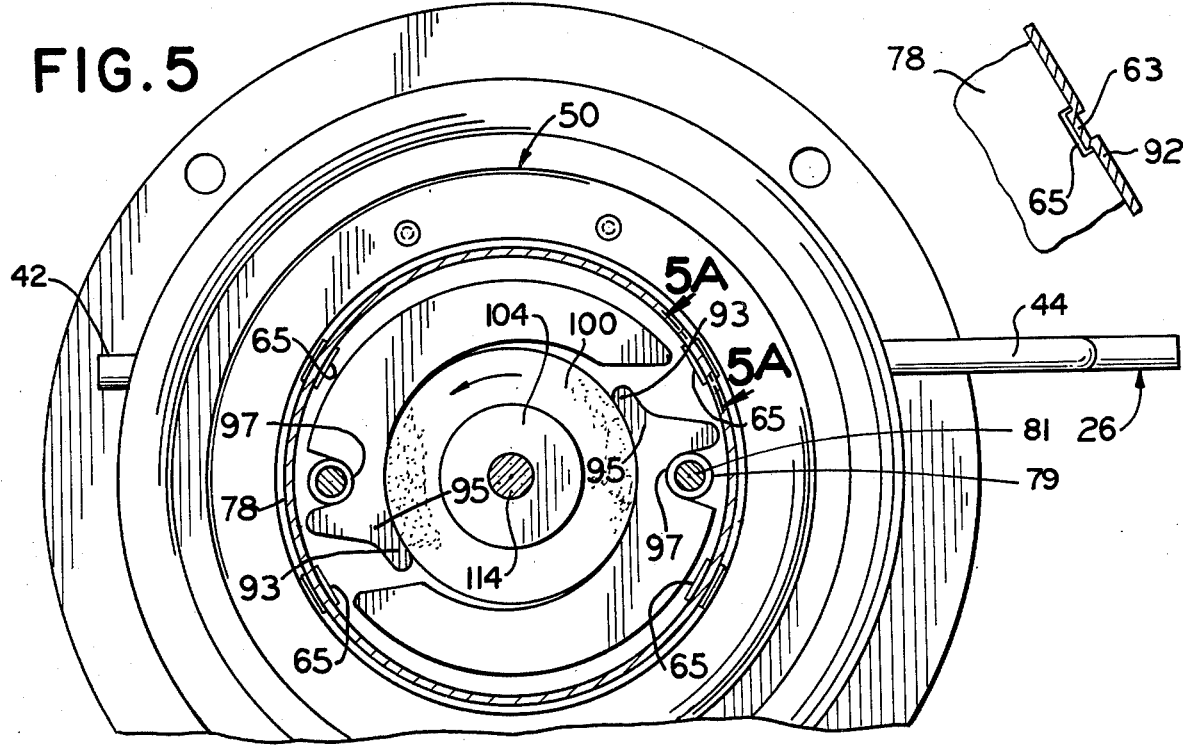
FIG. 5
FIG. 5A

FIG.6
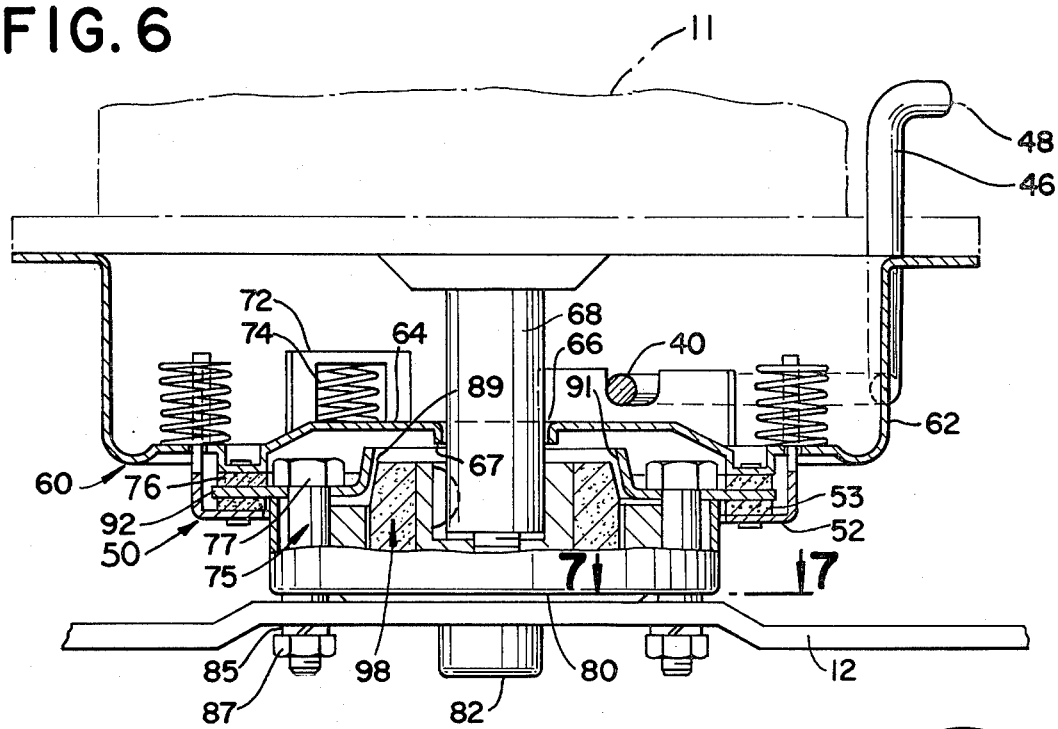
FIG.7
FIG.8
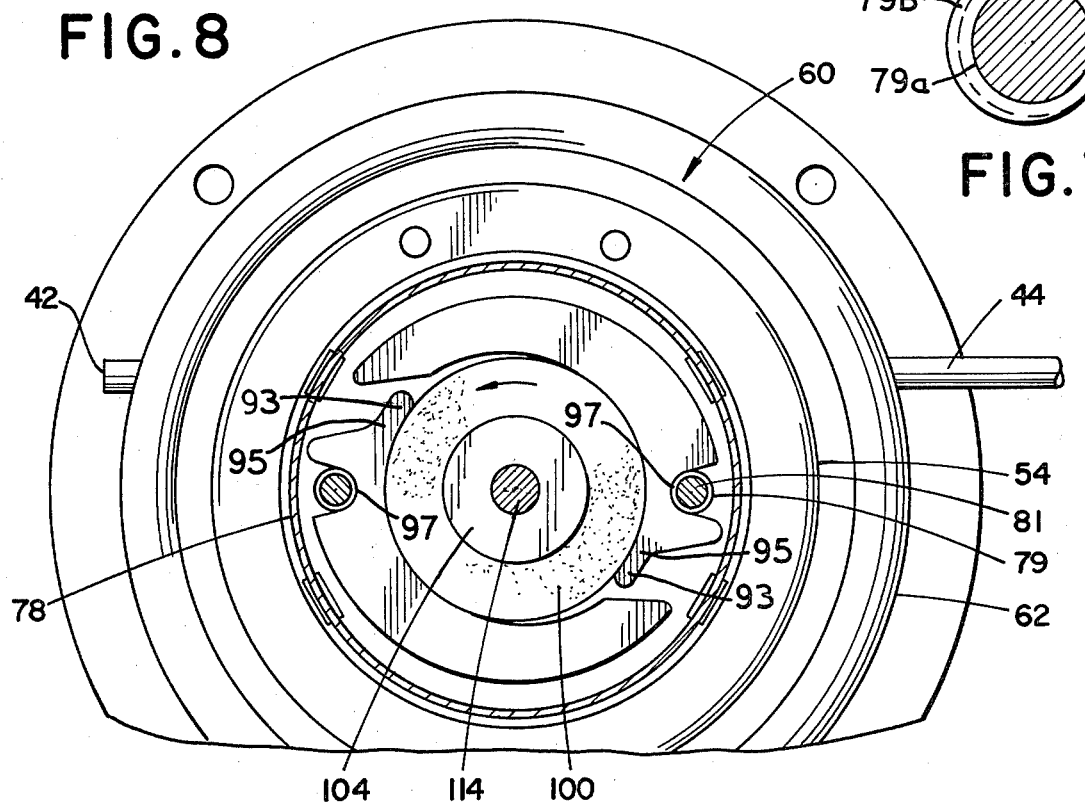

CLUTCH-BRAKE SYSTEM FOR ROTARY MOWER

BACKGROUND OF THE INVENTION

Rotary power lawn mowers have been manufactured for many years. Their usefulness is well-known and their usage is widespread. Also known, unfortunately, are the still existing hazards inherent with the use of rotary power mowers, namely the ever present danger of accidents and possible injuries to an operator.

The whirling blade of a roatry power mower becomes potentially dangerous when the operator for any reason leaves his normal position behind the mower or other persons, especially children, are near the mower.

Innumerable attempts have been made to develop a safe and reliable mechanism to minimize and preferably eliminate the causes responsible for the unnecessary and sometimes tragic accidents, mishaps, and injuries.

This invention provides an improved combination of a clutch and brake mechanism which automatically disengages the source of prime power supply (such as an engine) from the cutting blade and simultaneously applies positive braking that stops the whirling blade whenever the mower handle is released (intentionally or inadvertently).

The importance and significance of this invention becomes more apparent and can better be appreciated when it is realized that the blade control handle is predisposed to be in the blade stopping position under various predictable circumstances: i.e. when the operator is busy starting the mower engine; is removing the grass catcher to empty it or is attaching it back to the mower; is clearing debris, such as sticks from the vicinity of the mower; or is adjusting cutting heights, etc. Additionally, when a child approaches the mower, when the mower is pushed across a gravel driveway or when any other hazardous condition arises, the blade will be stopped by simply releasing the blade control handle. Unhappily, there are numerous recorded cases of accidents which occur under these and many other circumstances.

During the aforementioned events, it would be of paramount importance for obvious reasons of safety that two events take place almost simultaneously and instantly to insure that no injury shall occur: (1) that the mower blade be disengaged at once from its source of power and (2) that it be stopped positively at once and be held immobile.

Such safe operation is achieved through the use of this improved combination of clutching and braking mechanism—thus disconnecting the power supply from the mower blade—while, at the same time it engages a positive braking mechanism whenever the blade control handle is not in its normal operating position. Conversely, this invention released the brake and engages the clutching mechanism when the blade control handle is moved to its normal operating position.

It is an object of this invention to provide on a rotary power mower effective, foolproof and convenient means for disengaging the blade from its driving power source.

It is another object of this invention to provide safe, effective and reliable braking means for stopping the mower blade in a positive manner.

It is still another object of this invention to provide means for stopping the mower blade by automatically and simultaneously disengaging a clutching mechanism while engaging a braking mechanism.

It is still another object of this invention to stop the rotating blade of the mower by disengaging a friction type clutch mechanism while at the same time engaging a braking mechanism when a dead man control is released.

It is further another object of this invention to stop the rotating blade of a power mower by disengaging the friction type clutch mechanism and engaging a braking mechanism within a time span ranging from 1 to 3 seconds from the moment the dead man control mechanism is released.

It is still another object of this invention to disengage the power source of the mower from the blade and to stop the blade by means of greatly improved and highly reliable clutch and brake designs.

It is still another object of this invention to automatically disengage the blade when cutting is too heavy for the engine and thereby prevent engine stall.

Another object of this invention is an improved clutching mechanism design to improve the stress distribution in the clutch through the use of a hub member in the clutch assembly.

Still another object of this invention is a new and improved clutch mechanism which includes friction member which is both cylindrical and cone-shaped on the outside and hexagonal-shaped on the inside.

Still another object of this invention is to provide a new concept in clutch shoe and friction drum design which substantially improves the life of the clutch, improves dissipation of heat and simplifies construction.

It is another object of this invention to provide the clutch mechanism with unlined counterweighted clutch shoes which pivot about shoulder bolts.

It is still another object of this invention to provide shouldered bolts in the blade retaining assembly to insure that the clamp load of the blade fastening nuts do not distort the clutch or brake components. These shoulder bolts also serve as pivots for the flyweight-clutch shoes, transmit engine torque from these flyweights to the blade and help transmit braking torque from the brake disc to the blade.

SUMMARY OF THE INVENTION

This invention is directed to improved conical and centrifugal clutch mechanisms and associated braking mechanism designed to take clamp loading from the clutch mechanism by means of an intermediate sleeve member.

Instead of having metal shoes lined with friction material engaging a metal drum as with conventional drum clutches, the drum is made of friction material and the metal shoes are not lined. The friction material in the drum contains just enough abrasive to insure the shoes wear at approximately the same rate as the drum so there will always be maximum contact area between the drum and shoe. This minimizes the wear rate of both the drum and the shoe. This arrangement provides a much larger surface of friction material to wear than existed when only the shoes were lined and greatly extended to clutch life.

Improved heat dissipation is another important feature of this improvement. Because of the heat insulating qualities of the clutch facing material and because of the good heat conducting qualities of the metallic shoes the engine shaft is shielded from the heat generated by clutch engagement and this heat is conducted away from the shaft by the metallic clutch shoes. Clutch friction heat is no longer added to the combustion heat which must be dissipated by the engine.

This design also makes it possible to eliminate the conical clutch facing which previously lined the conical inner flange of the brake disc. The upper end of the friction drum now extends upward to conform to and engage the conical internal flange of the steel brake disc. Near the bottom inside of the clutch drum is a cylindrical spacer which extends from the end of the engine shaft to a clutch support washer.

In this improved design, the clamping stresses generated by the pilot screw which retains the clutch friction member are not transmitted through the clutch drum but through the spacer. This isolates the pilot screw from the reversing rotational forces transmitted by the clutch drum which would otherwise tend to loosen the pilot screw.

Another improvement consists of unlined counterweighted clutch shoes which are simpler and more economical.

Another improvement is the use of shoulder bolts which serve to hold the clutch and brake disc together, serve as pivots for the clutch shoes and serve to transmit torque from the clutch shoes to the blade. The use of shoulder bolts confines the clamping stresses of the blade attaching nuts to the bottom of the clutch housing and thereby prevents distortion of the brake disc and clutch that would otherwise result from excessive tightening of the blade attaching nuts. A through bolt surrounded by a sleeve would function similarly.

The clutch housing now serves the additional function of providing an enclosed support for the pilot bearing.

The brake compression plate and springs were redesigned to prevent cocking of the compression plate when the brake is released, to guard the brake disc from mowing debris and to simplify manufacture.

BRIEF DESCRIPTION OF THE DRAWINGS

FIG. 1A is a more detailed view of part of the control mechanism for the clutch and brake assembly;

FIG. 1B is a vertical cross section of the clutch drum assembly;

FIG. 1C is a horizontal cross section of the clutch drum assembly;

FIG. 4 is a section taken on line 4—4 of FIG. 2;

FIG. 5 is a section taken on line 5—5 of FIG. 2;

FIG. 5A is a section taken on line 5A—5A of FIG. 5;

FIG. 6 is a section taken on line 6—6 of FIG. 4, showing the springs that engage the brakes;

FIG. 7 is a section taken on line 7—7 of FIG. 6; and

FIG. 8 is the same as FIG. 5 but with the clutch shoes reversed.

DESCRIPTION OF THE PREFERRED EMBODIMENTS

Figure 1:
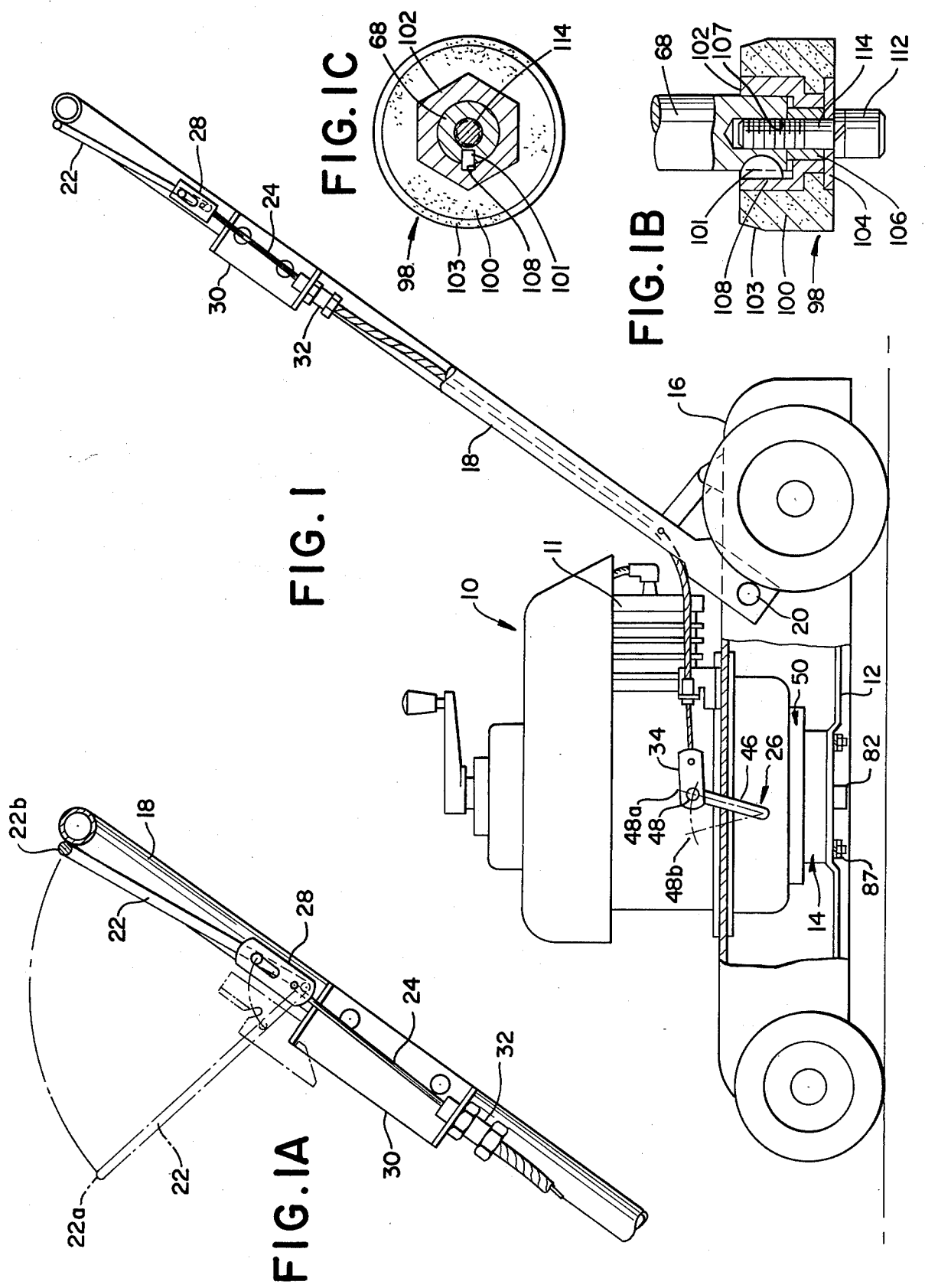
FIG. 1 is a side elevation showing one embodiment of the combination clutch and brake assembly.

Referring to the drawings, FIG. 1 illustrates a side elevation of a rotary type power mower, shown generally at 10. The power mower 10 has a power supply source, such as an engine 11, a mower blade 12, which is suspended from a combination multi-purpose member, shown generally at 14, a mower shroud 16 and a mower control handle 18, which is pivotally connected to the mower shroud at a point 20.

A pivotable control lever 22 is attached to the upper portion of the control handle 18, as seen in FIGS. 1 and 1A. A slidable, flexible connection 24 is secured at one end to the control lever 22 and at the other end to a pivotable actuating lever assembly generally seen at 26, FIG. 1. The pivotable control lever mechanism 22 includes a slotted link 28, a mounting bracket 30, an anchoring coupling 32, and an actuating plate 34, which swings the actuating lever assembly 26 through an arc, as from the non-engaged position 48b to an engaged position 48a.

The actuating lever assembly shown at 26 in FIG. 1 has a generally M-shaped configuration, best seen in FIG. 4. The actuating lever 26 has two lobes 36 and 38 located on either side of an interconnecting section 40. At its extremities, lever 26 has a pilot end 42 at one end and an actuating end 44 at the other. The actuating end 44 extends vertically to form an actuating arm portion 46 and an actuating pilot end 48 which is engaged in the actuating plate 34 in FIGS. 2 and 3.

Figure 2:
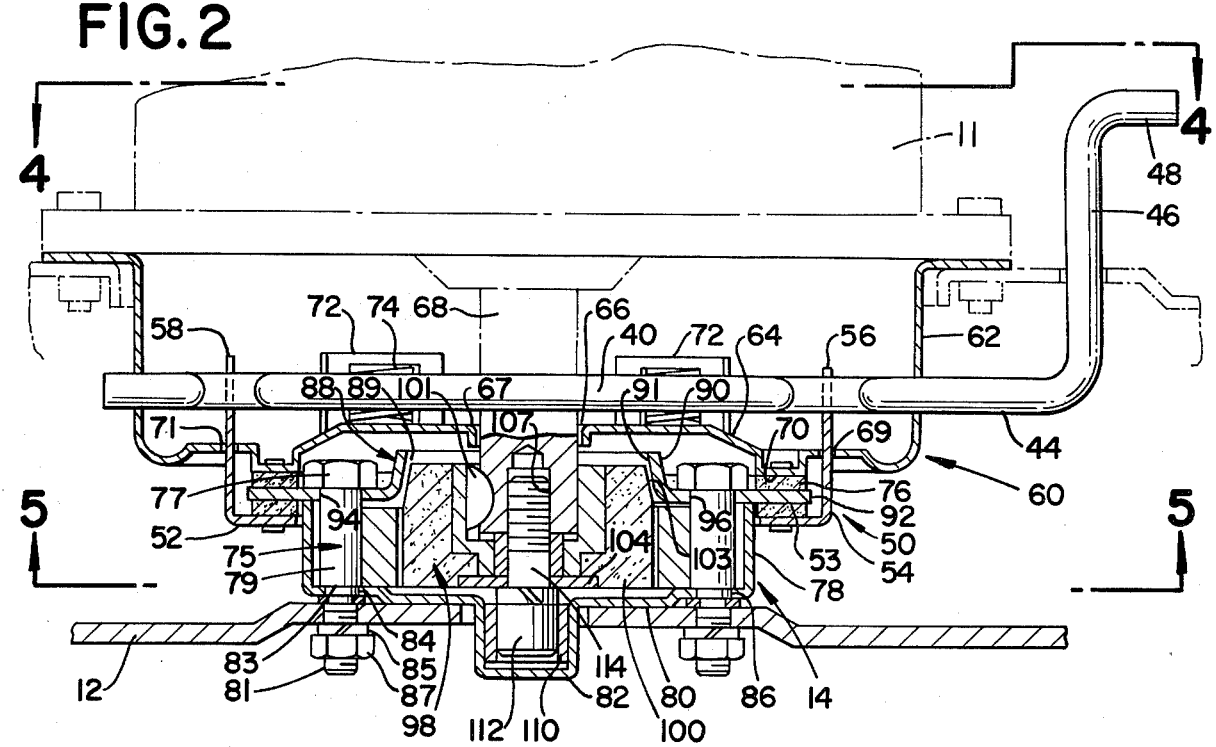
FIG. 2 shows a cross section of the clutch and brake mechanism with the clutch released and the brake engaged.
Figure 3:
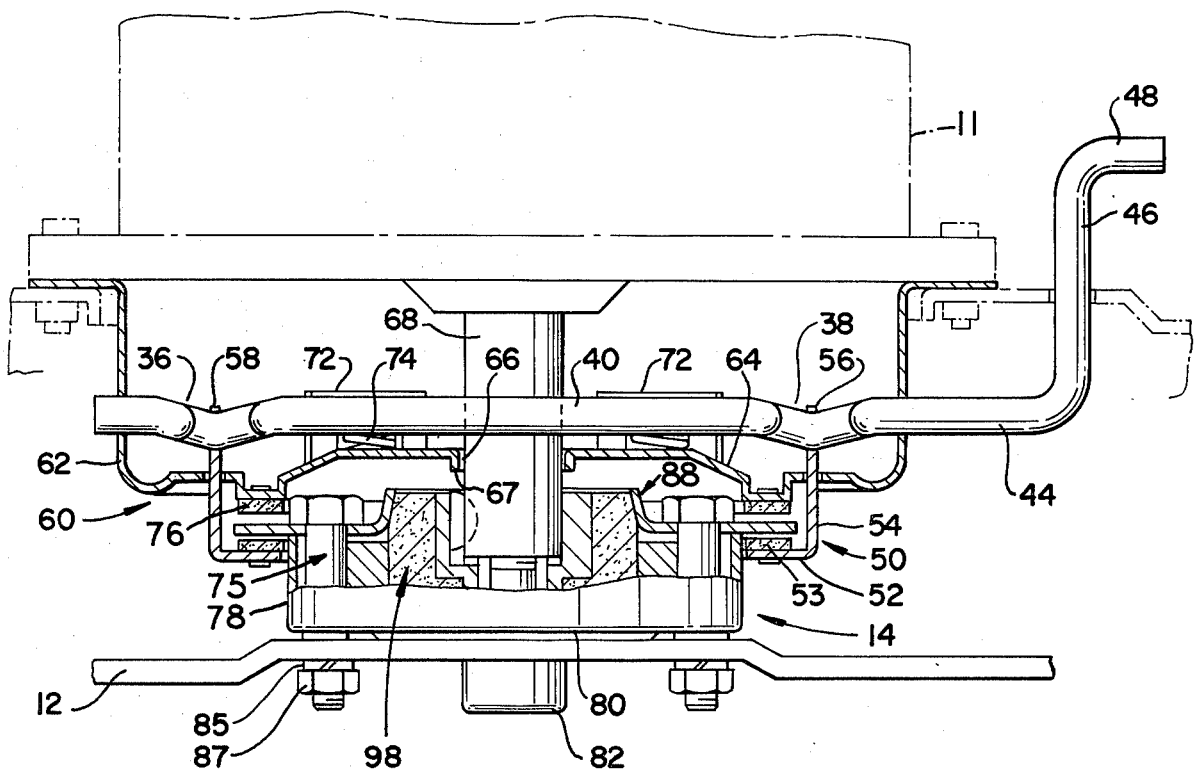
FIG. 3 illustrates the clutch and brake mechanism in partial cross section showing the clutch engaged and the brake released.

Partially surrounding member 14 is a generally circular compression plate seen at 50 in FIG. 2. The compression plate 50 has an inwardly disposed circular flange section 52 which is continuously connected to a vertical wall section 54. Extended portions of the wall 54 make up a plurality of brake releasing ears, such as 56 and 58 and spring lugs 72. Friction-type braking material 53 is attached to the topside of the flange section 52.

A circular spring housing generally seen at 60 is disposed above the brake housing 50. The spring housing 60 is comprised of a wall section 62 and a generally horizontal bottom section 64. In the center of the bottom section 64 is an opening 66, defined by a circular flange 67. A drive shaft 68, which is rotated by the engine 11, protrudes through the opening 66. Between the wall section 62 and the opening 66 is a concentric brake section 70.

Projecting through the bottom section 64 of the spring housing 60 is a plurality of spring lugs projecting from the compression plate 50, one of which is illustrated at 72. Each spring lug 72 retains a spring, one of which is shown at 74. While four lugs and springs are shown in the preferred embodiment, the number of lugs and springs is by no means limited to the numbers illustrated.

Friction material is attached to the underside of the brake section 70. Between the spring housing wall section 62 and the concentric brake section 70 are disposed two kidney-shaped slots 69 and 71, FIG. 4, located at 180 degrees from one another and through which protrude the brake releasing ears 56 and 58.

Member 14 is comprised of three interconnected sections: a vertical clutch housing 78 which is continuously connected to a blade mounting hub 80, which in turn is continuously connected to a pilot bearing cup 82. The blade mounting hub 80 has a plurality of holes, such as 84 and 86, which are best shown in the preferred embodiment illustrated in FIG. 2.

A combination clutch cone cup and brake flange 88 is comprised of a conical clutch flange portion 90 and a horizontally disposed brake disc portion 92, which contains a plurality of holes, such as shown at 94 and 96. The conical flange portion 90 has an internal face 91 which is disposed at a slight inward angle about 15° to the vertical, and which defines an opening 89.

Protruding downward from the brake disc are four driving lugs 63 which engage mating slots 65 in the flange of the clutch housing 78 as shown in FIG. 5A. Extending upward astride each of the shoulder bolt heads are lugs which prevent the shoulder bolts from turning.

The holes 84 and 86 in the blade mounting hub 80 are disposed to be in center line alignment with the holes 94 and 96 in the brake disc 92. A plurality of shoulder bolts, such as shown at 75, have a head section 77 connected to a body section 79, a portion of which terminates in a threaded section 81 which is of smaller diameter than the body portion 79. One end of this smaller diameter is threaded. Near the other end is a retaining ring groove 79a for a retaining ring 79b as shown in FIG. 7. At the juncture of the body section 79 and the threaded section 81 is formed a shoulder 83.

The bolt 75 which fits through the aligned holes 94 and 84 is designed so the bolt head 77 will rest on the top surface of the brake disc 92 while, at the same time, the shoulder 83 rests on the top surface of the blade mounting hub 80. After the mower blade 12 is positioned in place, it is secured to the underside member 14 by means of lock washers 85 and nuts 87, making members 12, 14 and 88 one "solid" assembly. Projections pierced from the brake disc engage the hexagonal head of the shoulder bolts preventing them from turning.

A clutch drum assembly is shown at 98, FIG. 1B and 1C. It is also seen fully at FIG. 2 and partially in FIGS. 3 and 6. The clutch drum assembly 98 comprises a drum and cone portion 100, FIG. 1B, assembled to a hexagonal hub 102, a support washer 104, and a sleeve 106, which abuts against the top side of the washer 104. A portion 103 of the cone 100 is disposed at a slight angle which matches the angle of the internal face 91 of the conical flange portion 90. A longitudinal slot 108 in the hub 102 serves as a keyway for locking the clutch assembly 98 to the drive shaft 68 by means of a key member 101.

A pilot screw bushing 110 in FIG. 2, which is pressed into the pilot bearing cut 82, receives the head 112 of a pilot screw 114. The pilot screw 114, which retains the washer 104 and sleeve 106, screws into a mating tapped hole 107 which is in the end of the drive shaft 68.

This design permits the sleeve 106 to absorb the axial clamping load that develops when the pilot screw 114 is tightened. Since it does not exert a clamping force against the clutch friction member or the hub, the pilot screw is relieved of any torsional loads that may be transmitted between the drum 98 or hub 102 and the drive shaft 68.

The torsional acceleration and deceleration forces transmitted by the hub are high in magnitude and frequency. If the pilot screw clamped through the hub as in conventional construction the pilot screw would too frequently work loose and render the clutch inoperable.

The counterweighted clutch shoes are not lined with clutch facing material. They are disposed at 180° from one another.

The clutch shoes pivot about shoulder bolts 75 which also serve to hold the clutch assembly together, hold the blade onto the clutch and transmit torque from the clutch shoes to the blade.

When the blade 12 is stopped by an obstruction, the flyweights no longer experience any centrifugal force that would urge them into engagement with the drum.

As a result, the centrifugal portion of the clutch assembly is released and the engine therefore no longer rotates the blade.

When the cutting blade impacts a solid object, the drive shaft 68 is deflected. Contact with flange 67 of the spring housing prevents permanent set in the drive shaft.

In use, the operator first starts the engine 11, which at once begins to spin the drive shaft 68 and the clutch cone assembly 98 which is keyed to the drive shaft by means of the key 101. When the operator moves the control lever 22 from a non-engaged position as shown at 22a in FIG. 1A, to an engaged position as shown at 22b, the slidable flexible connector 24 moves in a generally upward direction, retracting plate 34 in a generally rearward direction, and thus pivoting the actuating arm 46 from a non-engaged position as shown in 48b, to an engaged position as shown at 48a.

Two events take place simultaneously inside of the combination brake compression plate member 50. As the operator moves the control lever 22 from its non-engaged to its engaged position, the actuating arm 46 swings rearward, causing the two lobes 36 and 38 to exert a downward force on the two brake releasing ears 56 and 58, pushing them downward, FIG. 3. This action has the effect of eliminating the frictional forces that the braking materials 53 and 76 are exerting on the bottom and top sides, respectively of the brake disc 92.

As the brake disc 92 is being released, the clutch cone cup 88 moves downward and the internal face 91 of the conical clutch flange 90 engages the rotating clutch assembly 98. Friction between these conical members creates a light driving force to rotate the blade. As the rotation occurs, centrifugal force acting on the clutch shoes 95 causes them to pivot on the shoulder bolts 75. The toes 93 of the shoes grip the clutch drum. This creates a substantial driving force pivoted on, as at 97, or shoulder bolt 75.

Conversely, when the operator releases the control lever, the reverse events occur. The action of the compression springs 74 moves the clutch cone and brake disc 88 upward, disengaging the conical clutch cone 90 from the clutch assembly 98 and at the same time engaging the braking materials 53 and 76 against the braking disc 92. The rotary blade is stopped and held positively locked out. Centrifugal force ceases to activate the clutch shoes. Ears 69 and 71 acting on lobes 36 and 38 rotate actuating arm 46 from its engaged position 48a to its disengaged position 48b. This in turn moves the cable 24 downward and moves the control lever 22 from its engaged position 22b to its disengaged position 22a.

The operator must hold the control lever 22 in its engaged position 22b against the mower control handle 18 for the mower blade to rotate. Should the operator let go of the control handle 22, either accidentally or intentionally, this constitutes a dead man control which immediately disconnects the engine drive shaft from the blade, stopping the blade. Thus, should the operator carelessly put his hand in the vicinity of the mower blade, an accident would be avoided because the blade will no longer be rotating.

When extremely heavy cutting pulls down the engine near its stall speed, the centrifugal force acting on the flyweights does not develop sufficient force to drive the blade and the grass will stop the blade, eliminating the centrifugal force entirely. With only the cone clutch engaged, the engine will resume speed instead of stalling. The clutch will automatically re-engage when the mower is pulled out of the uncut grass.

FIG. 8 shows the clutch shoes in mirror image position which provides a different set of forces and a different cutout speed.

The invention has been described in great detail sufficient to enable one of ordinary skill in the art to make and use the same. Obviously, modifications and alterations of the preferred emmbodiment will occur to others upon a reading and understanding of the specification and it is our intention to include all such modifications and alterations as part of our invention insofar as they come within the scope of the appended claims.

What is claimed is:

1. A brake clutch mechanism for a rotary power mower having a cutting blade member comprising:
    a clutch assembly including a brake disc;
    a pivotable control lever for operating said clutch assembly and brake disc;
    said clutch assembly having a cylindrical drum and tapered cone of frictional material forming a cone clutch and operating in association with a mating tapered metal clutch cone cup fixed to said brake disc;
    said brake disc including means which simultaneously transfer power from the clutch assembly to the cutting blade member, wherein actuation of the pivotable control lever causes the clutch assembly and brake disc to gradually engage, and further wherein the tapered cone produces a gradual acceleration in the cutting blade member;
    a plurality of counterweighted flyweight clutch shoes pivotally mounted on said brake disc outwardly of said clutch drum and adapted to engage the clutch drum, thereby transmitting power to the brake disc and to the cutting blade member;
    a drive shaft having an end extending into one end portion of said clutch drum and drivingly connected thereto by key means, a support washer adjacent another end portion of said drum, a sleeve within the other end portion between said washer and the end of said shaft, a pilot screw extending through said washer and sleeve and threadedly connected to the end of said shaft whereby when said screw is tightened, the washer and sleeve are compressed without compressing any part of said drum, thereby relieving the drum of compression stresses and relieving the screw of torsional forces transmitted by said drum so that said screw is not loosened.

2. The mechanism of claim 1 wherein the clutch assembly and cylindrical drum is retained by the socket head cap screw which serves as a pilot which centers the cutting blade member and forming a pilot guide on the end of the drive shaft which fits slidably inside of a pilot bearing cup.

3. The mechanism of claim 1, in which the cylindrical drum periphery is entirely of frictional material which is generally a poor heat conductor,
    wherein the heat generated in said clutch passes outwardly through said clutch face and through said flyweight clutch shoes rather than inwardly toward said shaft.

4. The mechanism of claim 1, in which each of said counterweighted flyweight clutch shoes has an unlined toe portion and a weight portion, the toe being in substantially curved direct sliding contact with the cylindrical clutch drum made of clutch facing material.

5. The mechanism of claim 3, in which th clutch drum has a strong hub member which distributes the forces concentrated at the engine shaft key over a large area of the weaker clutch facing material, thereby minimizing stresses in the clutch facing material.

6. The mechanism of claim 1, in which there is a brake pressure plate enclosing the brake disc and connecting means between said control lever and said plate to actuate said plate,
    said plate having an upturned flange outwardly thereof to strengthen the plate and to protect the brake disc from thrown debris.

7. The mechanism of claim 6, in which more than two symmetrically spaced projections which are part of and extend upwardly from the upturned flange of the compression plate are engaged by springs which raise the compression plate into a braking relationship with the brake disc when the release lever is not actuated,
    the symmetrical spacing of the spring projections providing equal release of the brake compression plate when the brake release lever is actuated.

8. The device of claim 1, in which the taper in the cone clutch is 15° so that wear is minimal and there is still adequate frictional force on the cone.

9. The mechanism of claim 1 in which a spring housing surrounds and is in close proximity to the drive shaft, whereby it provides momentary support for the drive shaft when, as a result of the blade impacting some solid object, the drive shaft is deflected until contact with the spring housing occurs, thereby assisting in avoiding permanent set in the drive shaft.

10. The mechanism of claim 1, in which the flyweight clutch shoes may be positioned in mirror image position to provide for a different cutout speed.

11. The mechanism of claim 4 wherein the friction material is sufficiently abrasive to insure the clutch shoes will wear as fast or slightly faster than the cylindrical drum, thereby maintaining maximum area of contact between the two and minimizing the wear of both.

12. The mechanism of claim 1, wherein the combination brake disc and clutch housing have locking lugs to prevent turning the housing under stress conditions, such as when the cutting blade member hits an object.

* * * * *